(No Model.)
J. DARLING.
HORSE CHECKING AND UNCHECKING DEVICE.
No. 424,181. Patented Mar. 25, 1890.
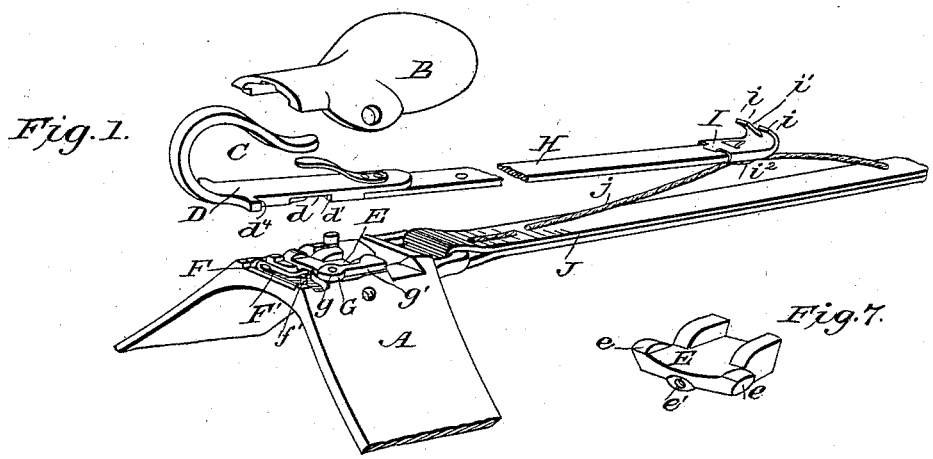
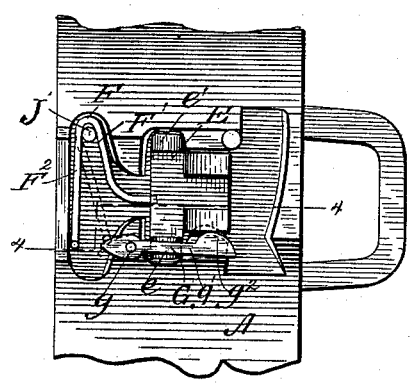
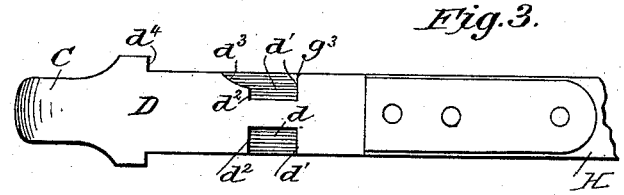
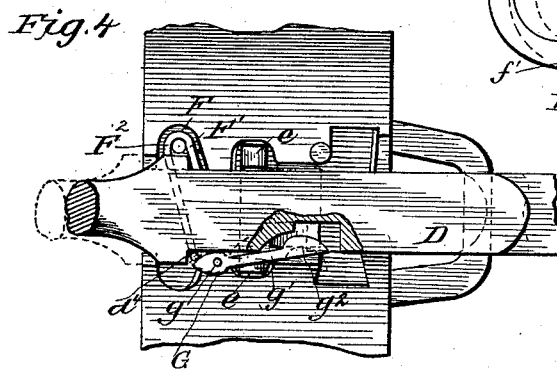
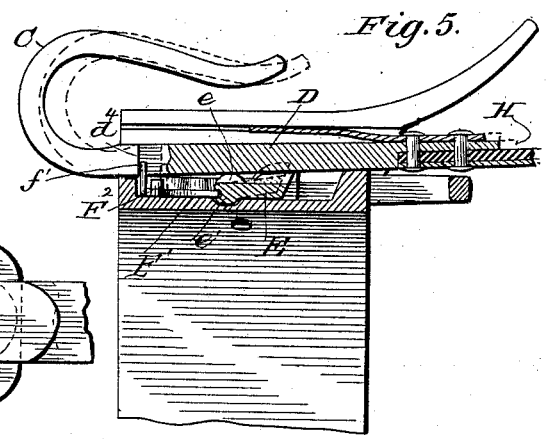
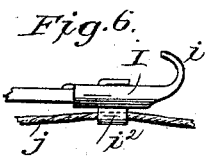
WITNESSES:
Fred G. Dieterich
P. B. Turpin
INVENTOR:
Joseph Darling
BY Munn & Co
ATTORNEYS

UNITED STATES PATENT OFFICE.

JOSEPH DARLING, OF BALDWIN, PENNSYLVANIA.

HORSE CHECKING AND UNCHECKING DEVICE.

SPECIFICATION forming part of Letters Patent No. 424,181, dated March 25, 1890.

Application filed December 5, 1889. Serial No. 332,632. (No model.)

*To all whom it may concern:*

Be it known that I, JOSEPH DARLING, of Baldwin, in the county of Butler and State of Pennsylvania, have invented a new and useful Improvement in Harness-Saddles, of which the following is a specification.

My invention is an improvement in harness saddles, and particularly in that class of such devices in which the check or water hook is movable forward from and back to the saddle and in which devices are provided for securing such hook to the saddle so it may be released from the buggy or other vehicles and automatically secured from the said vehicle, so that the driver may uncheck the horse and check him up again without leaving his seat in the vehicle.

The invention consists in the novel constructions and combinations of parts, as will be hereinafter described and claimed.

In the drawings, Figure 1 is a perspective view showing the tree-saddle proper or cover and hook-bar detached. Fig. 2 is a top plan view of the tree and the parts connected therewith, the saddle proper or cover and the hook-bar being removed. Fig. 3 is a bottom view of the hook-bar. Fig. 4 is a similar view to Fig. 2, except that the hook-bar is shown in place. Fig. 5 is a longitudinal section of the improvement, and Figs. 6 and 7 are detail views.

The saddle or support may be formed of the tree A and the saddle proper or cover B, a space being provided between such parts for the passage of the check-hook bar and for the reception of the securing and releasing mechanism, hereinafter described.

The check-hook C may be of the usual form and is provided with the shank extension or bar D, which is notched in its under side at $d$, the rear walls $d'$ of said notches being engaged by the dog in locking the bar D to the support, while the front walls $d^2$ of said notches $d$ serve to depress said dog when the hook-bar is drawn back from its locked position. One of the notches $d$ has an extension or wing which has a wall $d^3$ for engaging the detent in the manner more fully described hereinafter.

The dog E is pivoted at its front end near its upper edge at $e$, and is provided at said end with a lug or portion $e'$, which depends below the axial line of the said pivots $e$, so that rearward pressure on said portion $e'$ will operate to tilt the dog on its pivots $e$ and serve to elevate its rear end, such rear end rising in such case to position for engagement by the hook-bar. To effect this rearward pressure on the portion $e'$, I provide a lever-like rod F, pivoted at $f$, having an arm F', for engagement by the hook-bar, and an arm $F^2$, the point of which bears against the portion $e'$ of the dog and serves at each rearward movement of arm F' to tilt the dog, as will be understood from the drawings. By preference the rod F is made of flexible spring-wire, and the arm F' is extended under the hook-bar from one to the opposite side thereof, and has an upwardly-bent portion $f'$, which bears in rear of a rearwardly-facing shoulder $d^4$ at the side of such bar, such construction and arrangement forming a convenient detachable connection between the hook-bar and the lever-rod F, and the portion $f'$ serving as a portion to engage the detent presently described.

Now, in the operation of the parts before described it will be seen that if the hook-bar be in the position shown in full lines, Fig. 5, it will not be engaged by the dog, but may be drawn freely forward by the horse. If, however, the hook-bar be drawn to the position shown in dotted lines, Fig. 5, the movement of the hook-bar will have rocked the lever-rod to lift the rear end of the dog into position to engage the dog and lock the same firmly in the saddle, so that the strain of the horse's head cannot detach the parts. Now, if the hook-bar be drawn farther back to the position shown in full lines, Fig. 4, the front walls $d^2$ of the notch $d$ will have engaged upon the dog and forced the same down to the position shown in Fig. 4, so that if said dog be held down in such position the hook-bar may be drawn freely forward to permit the horse to drink or to release his head for any other purpose desired. To hold this dog down when desired, I provide a detent G, which, by preference, is laterally movable, and is constructed as shown in Fig. 4, having portions arranged to be engaged and operated by the hook-bar in both its back and forward movements.

In describing said detent in detail it may be said to comprise a lever pivoted between its ends at $g$, having its rear arm $g'$ movable over the rear end of the dog, as shown in Fig. 4, and its forward end arranged in the path of the hook-bar, so it will be engaged by the shoulder $d^4$ or the part $f'$ of lever-rod F. The rear arm $g'$ is adapted at $g^2$ for engagement by the part or edge $g^3$ of the hook-bar as the latter moves forward from the position shown in full lines, Fig. 4.

Now, in operation the bar may be locked, as before described. When locked, the several parts will be in the position shown in dotted lines, Fig. 5, and the tension of the lever-rod F on the hook-bar will indicate to the driver that the parts are in locked position. To release the hook, the bar is drawn back to the full-line position shown in Fig. 4, the bar first depressing the dog and then moving the detent to a position over the dog, thus holding the dog down. The bar may then move freely forward, and when it has escaped from the dog the said hook-bar at $g^3$ will engage the detent at $g^2$ and throw it clear of the dog and to the position shown in full lines, Fig. 2, and dotted lines, Fig. 4, the several parts of the device then resting in position to again secure the hook-bar when such bar is again drawn back.

To the rear end of the hook-bar I secure a strap H, at the rear end of which I provide a hook-support I, having upwardly-projecting hooks $i$, separated by a slot $i'$, adapted for engagement by a knob or button on a whip, so that the driver may by his whip engage the hooks $i$ and draw the strap and hook-bar back. On the under side of this strap H, at its rear end, I provide an eye $i^2$, preferably integral with the support I and arranged to slide on a cord $j$, such cord being connected at its opposite ends with the back-strap J, and operating to guide the strap and hold the same from swinging about when the horse is in motion.

In the present invention it will be seen that the dog is not at all times spring-actuated, but is lifted by a lever-like construction into engagement with the hook-bar and drops out of such engagement when released. It will also be noticed that the detent is positively moved by the hook-bar as the latter moves forward out of engagement with the dog, the said detent being only engaged with the dog the short time intervening between the movement of the hook-bar from its extreme rearmost position to a position just in advance of that in which it is engaged by the dog.

Having thus described my invention, what I claim as new is—

1. In a device substantially as described, the combination of the saddle or support adapted to receive the check-hook bar, the dog for engaging said bar, and the laterally-movable detent for securing said dog out of such engagement, substantially as and for the purposes set forth.

2. In a device substantially as described, the combination of the saddle or support, the dog pivoted at its front end and having at such end a portion $e'$, and a spring or elastic actuating-rod arranged in front of the dog and engaging said portion $e'$, substantially as set forth.

3. In a device substantially as described, the combination of the saddle or support, the dog supported therein, and the hook-bar movable longitudinally above said dog and arranged to be secured thereby, and the detent movable laterally in over said dog and out clear thereof and arranged for operation by the hook-bar, all substantially as set forth.

4. In a device substantially as described, the combination of the saddle or support adapted to receive the hook-bar, the dog for engaging said bar, and the detent of lever-like construction having one arm or portion arranged to engage the dog and having a portion arranged for engagement by the hook-bar, substantially as set forth.

5. In a device substantially as described, the combination of the saddle or support, the hook-bar movable longitudinally therein and provided with notches $d$ $d$, the dog held in said support below the hook-bar and having at its rear end portions movable into and out of notches $d$, and the detent arranged for operation by the hook-bar and movable laterally into and out of engagement with the dog, all substantially as and for the purposes set forth.

6. In a device substantially as described, the combination of the saddle or support, the hook-bar, the dog pivoted at its front end and having a portion $e'$ at said end below its pivot, and the lever-like rod F, pivoted at $f$, having an arm $F^2$ to engage said portion $e'$, and provided with an arm or portion for engagement by the hook-bar, substantially as set forth.

7. The combination, in a device substantially as described, of the saddle or support adapted to receive the hook-bar, the dog arranged to engage and hold said bar, and the detent G, pivoted between its ends at $g$, having its rear end movable over the dog and arranged at such end at $g^4$ for engagement by the hook-bar, and having its front end arranged for engagement by the hook-bar, whereby the said bar may by its movement effect the adjustment of the detent into and out of engagement with the dog, substantially as set forth.

8. In a device substantially as described, the combination of the saddle or support adapted to receive the hook-bar, the dog pivoted at the upper edge of its front end, and provided at said end with a lug or portion $e'$ below said pivots, the lever F, having an arm $F^2$, to engage portion $e'$, and an arm $F'$, arranged for engagement by the hook-bar, the detent G, pivoted between its ends at $g$, having its rear arm $g'$ movable over the rear end of the dog and its forward end arranged in the path of the hook-bar, substantially as and for the purposes set forth.

JOSEPH DARLING.

Witnesses:
M. DAILEY,
C. G. GRAY.